(12) United States Patent
Randall

(10) Patent No.: US 6,476,531 B1
(45) Date of Patent: Nov. 5, 2002

(54) WINDING FOR SWITCHED RELUCTANCE MACHINES

(75) Inventor: Steven Paul Randall, Leeds (GB)

(73) Assignee: Switched Reluctance Drives Ltd., Harrogate (GB)

( * ) Notice: Subject to any disclaimer, the term of this patent is extended or adjusted under 35 U.S.C. 154(b) by 42 days.

(21) Appl. No.: 09/610,804

(22) Filed: Jul. 6, 2000

(30) Foreign Application Priority Data

Jul. 16, 1999 (GB) ................................ 9916797

(51) Int. Cl.$^7$ ................................ H02K 3/04
(52) U.S. Cl. ................................ 310/208
(58) Field of Search ................................ 310/168, 179, 310/180, 181, 194, 208, 259; 29/596–598

(56) References Cited

U.S. PATENT DOCUMENTS

| 3,027,475 A | * | 3/1962 | Gaudry | 310/208 |
| 3,443,136 A | * | 5/1969 | Freeman et al. | 310/208 |
| 3,829,720 A | * | 8/1974 | Swanke et al. | 310/43 |
| 5,043,618 A | | 8/1991 | Stephenson | 310/168 |
| 5,548,173 A | | 8/1996 | Stephenson | 310/181 |
| 5,650,682 A | * | 7/1997 | Smart | 310/181 |
| 5,654,601 A | | 8/1997 | Fulton | 310/168 |
| 5,729,071 A | | 3/1998 | Steiner | 310/254 |
| 5,780,951 A | | 7/1998 | Stephens | 310/172 |
| 5,844,343 A | * | 12/1998 | Horst | 310/184 |
| 5,886,444 A | * | 3/1999 | Enomoto et al. | 310/208 |

FOREIGN PATENT DOCUMENTS

| EP | 0 573 198 | 12/1993 |
| WO | 98/50998 | 11/1998 |

OTHER PUBLICATIONS

Stephenson et al., "The characteristics, Design and Application of Switched Reluctance Motors and Drives" PCIM '93, Nürnberg, Jun. 21–24, 1993.

* cited by examiner

Primary Examiner—Tran Nguyen
(74) Attorney, Agent, or Firm—Dicke, Billig & Czaja, P.A.

(57) ABSTRACT

A novel coil shape, particularly suitable for 1-phase switched reluctance machines, is disclosed. The coil may be wound on a bobbin which is then inserted into the stator or it may be free standing. The shape is such that it can be inserted into the stator without further deformation of its shape to allow subsequent components of the machine to be assembled.

26 Claims, 9 Drawing Sheets

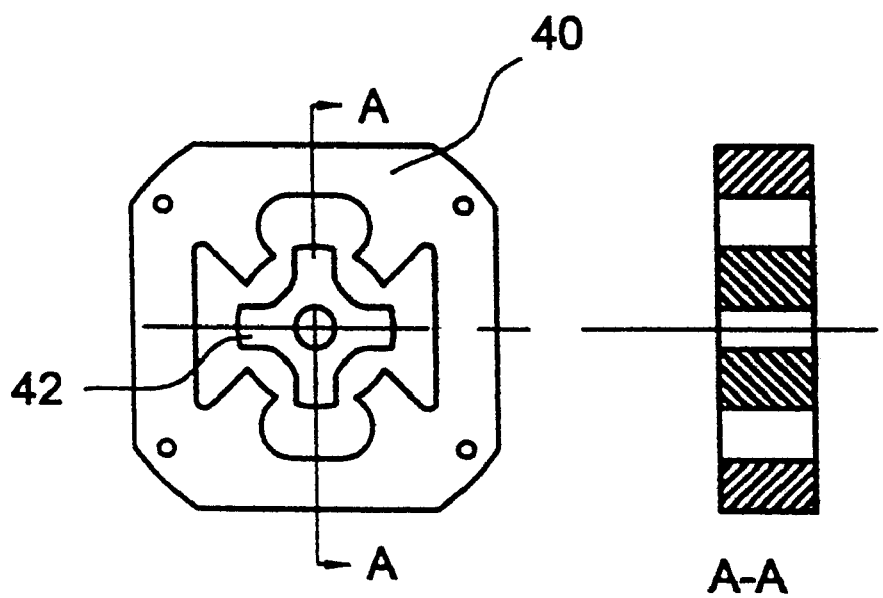
Fig 4(a)
Prior Art
Fig 4(b)
Prior Art
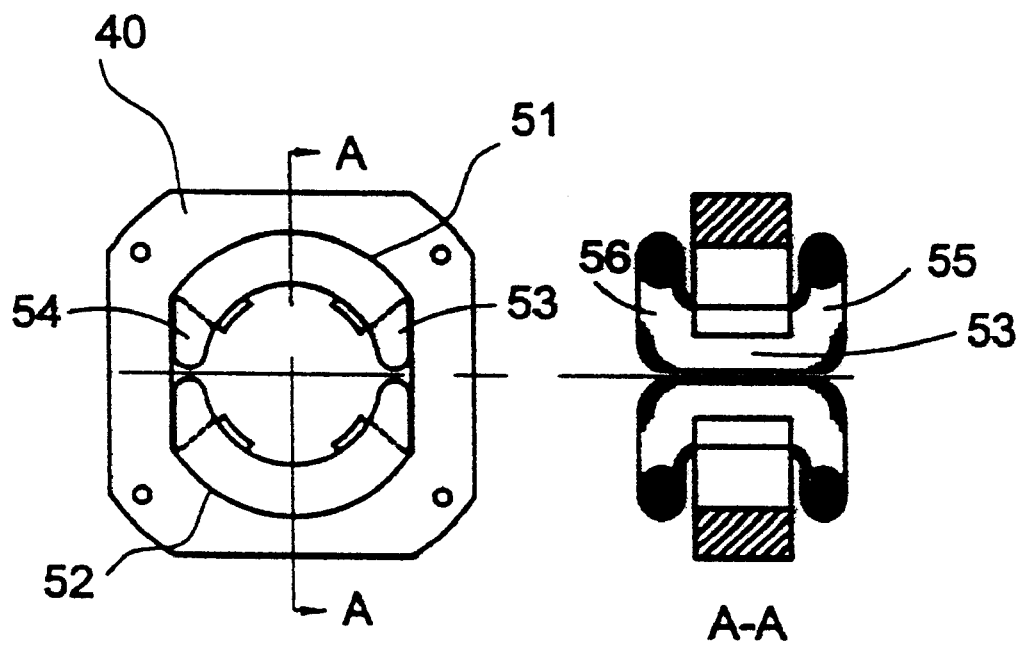
Fig 5(a)
Prior Art
Fig 5(b)
Prior Art

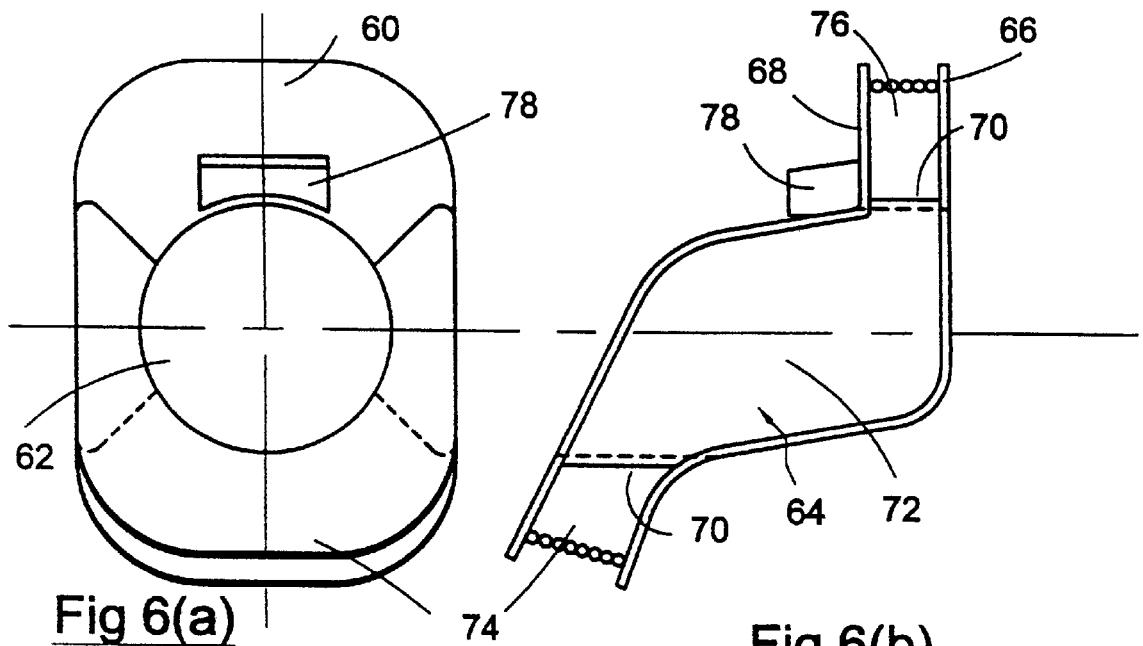
Fig 6(a)
Fig 6(b)
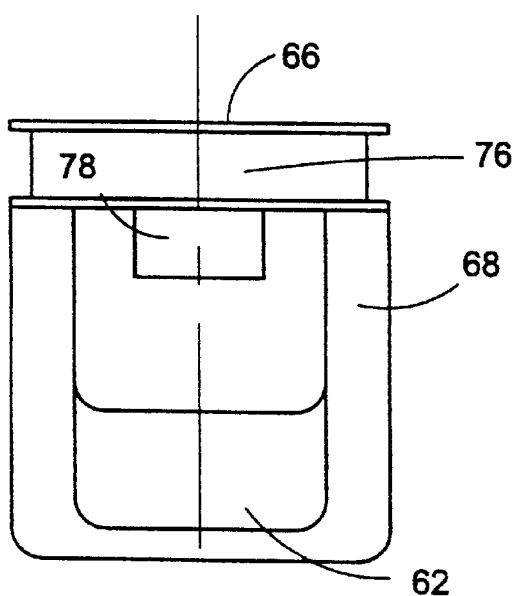
Fig 6(c)

Sect DD

WINDING FOR SWITCHED RELUCTANCE MACHINES

BACKGROUND OF THE INVENTION

1. Field of the Invention

This invention relates to windings for switched reluctance machines. The invention is particularly applicable to windings for single-phase machines.

2. Description of Related Art

Switched reluctance machines, in which the position of the rotor is used to switch the excitation of the windings, are now well-established for many applications. The characteristics of such switched reluctance machines are described in, for example, "The characteristics, design and application of switched reluctance motors and drives" by Stephenson and Blake, PCIM '93, Nürnberg, Jun. 21–24, 1993, incorporated herein by reference. The present invention is generally applicable to switched reluctance machines operating as motors or generators.

FIG. 1 shows the principal components of a typical switched reluctance drive system. The input DC power supply 11 can be either a battery or rectified and filtered AC mains. The DC voltage provided by the power supply 11, which can be of constant or varying magnitude depending on the configuration chosen, is switched across the phase windings 16 of the motor 12 by a power converter 13 under the control of the electronic control unit 14. The switching must be correctly synchronized to the angle of rotation of the rotor for proper operation of the drive. A rotor position detector 15 is typically employed to supply signals corresponding to the angular position of the rotor. The output of the rotor position detector 15 may also be used to generate a speed feedback signal.

The rotor position detector 15 may take many forms, for example it may take the form of hardware, as shown schematically in FIG. 1, or of a software algorithm which calculates the position from other monitored parameters of the drive system, as described in EP-A-0573198 (Ray), incorporated herein by reference.

Some form of current feedback signal 18, using either an isolated or a non-isolated current transducer 19, is generally provided to the controller from either the phase winding(s) or the DC link.

FIG. 2 shows a cross-section of a prior art, 3-phase, switched reluctance machine in which the stator has six poles and the rotor has four poles. Each stator pole 21 carries a coil 23. Each of the coil sides extends along the space between adjacent stator poles. The coil extends around the stator pole at each end in the form of a semi-circular end portion which lies beyond the axial extent of the stator pole. The coils on diametrically opposite poles are connected in series or parallel to form one of phase windings 16. The stator poles in FIG. 2 are labeled to illustrate the three phases A, B, & C. The rotor poles 24 protrude from a rotor body 26. The rotor is mounted on a shaft 28 to rotate co-axially in the bore defined by the faces of the stator poles. Typically, both stator and rotor are formed by stacking laminations of electrical sheet steel and securing them together in known ways.

FIG. 3 generally shows typical switching circuitry in the power converter 13 that controls the energization of the phase winding 16. When switches 31 and 32 are closed, the phase winding is coupled to the source of DC power and is energized. Many other configurations of switching circuitry are known in the art: some of these are discussed in the Stephenson & Blake paper cited above.

The conventional method of manufacture of such motors is to produce laminations from electrical sheet steel and then to consolidate the required number of these laminations by one of a number of known methods. This produces a rotor stack, which is then mounted on a shaft, and a stator stack which can receive the coils.

Typically one coil is arranged around each pole, as shown in FIG. 2, though methods of using fewer coils are known. For example, U.S. Pat. No. 5,654,601 (Fulton), incorporated herein by reference, discloses a method of using coils only on alternate poles, and U.S. Pat. No. 5,043,618 (Stephenson), incorporated herein by reference, discloses a method of grouping two or more poles of like polarity under one coil. Having connected the coils to form the correct number of phases and flux patterns, the winding may be impregnated with a varnish to improve its reliability and thermal performance. End frames or a housing may then be added to produce a stand-alone assembly which can be tested for performance compliance, or assembled into a larger component.

FIGS. 4(a) and (b) show an end view and an axial cross section, respectively, of a stator 40 and rotor 42 having laminations suitable for use in accordance with U.S. Pat. No. 5,043,618. FIGS. 5(a) and (b) show two coils 51, 52 inserted in the stator 40 of FIG. 4(a) according to the prior art. It will be noted that each coil 51, 52 embraces two stator poles and that their coil sides 53, 54 (i.e. that portion of the coil lying between the axial extremes of the stator) both share a slot with a coil side of the other coil. Further, it will be seen that the two end windings 55, 56 of each coil (i.e. that portion of the coil lying outside the stator) lie on the same side of the stator axis. It will be appreciated that the end windings are formed in this way in order to allow the rotor to be assembled into the completed stator assembly. To produce this shape, the coil can be wound in a flat plane, inserted into the stator and pressed into shape. Alternatively, it must be wound in situ, with each turn being formed to the final shape as the winding proceeds.

In an attempt to reduce the cost of drive systems, it is becoming increasingly common to integrate the power switches and electronic control unit into the housing of the motor, thus reducing the number of separate assemblies required. This entails connecting the winding(s) of the machine to the power switches after the electronic components have been assembled to the housing of the machine. Only then can the complete drive system be tested. It would be more convenient to assemble the windings to the electronic sub-assemblies and test that complete unit before assembling the winding into the stator.

It is well-known that some forms of synchronous and induction motors, especially single-phase shaded pole motors, use a system in which a bobbin is wound with the conductor and is then placed on part of a core for a laminated yoke to be pressed into a laminated stack. Such an arrangement is shown in U.S. Pat. No. 5,729,071, incorporated herein by reference. However, these methods are not applicable to the single-piece, salient pole laminations used in switched reluctance machines, since the bobbin(s) could not be inserted into the stator.

SUMMARY OF THE INVENTION

According to one aspect of the present invention there is provided a winding for a reluctance machine comprising a single coil having opposed side portions, each having first and second ends, a first end loop connecting the first ends of the side portions, and a second end loop connecting the second ends, at least one of the first and second end loops defining an arch between the side portions such that an enclosed aperture is defined by the winding when viewed generally along the direction of the side portions. According to one embodiment, the winding of the present invention is of a shape that can be preformed and fitted into a stator.

Preferably, both the first and second end loops define arches between the side portions which project in opposite directions and, together, define the aperture. However, only one of the end loops needs to project in an arch to define the aperture, the other end loop remaining substantially within the plane of the side portions.

According to one form of the invention the coil is shaped to enable it to be connected to an electronic controller and tested before it is inserted into the stator of a switched reluctance machine.

Preferably the switched reluctance machine is a single-phase machine with a single coil which embraces all the poles.

Embodiments of the invention provide a winding shape which can be completely formed outside the stator and then inserted into the stator without further deformation being required to allow the rotor to be assembled. Only a single coil is required to magnetize the magnetic circuit of the machine. If the wire from which the coil is made is sufficiently rigid, the coil will be able to retain its own shape without requiring further support. In many cases, however, it will be found preferable to wind the coil onto a specially shaped bobbin and insert that bobbin into the stator. The bobbin may also usefully have mounted to it a circuit board, for example an electronic controller for controlling excitation of the winding, or the components of a rotor position transducer (RPT), providing feedback for control of the machine. The RPT may provide signals indicative of rotor position or rotor movement.

When the winding has bobbin, it is possible to shape the bobbin so that it fills the gaps between stator poles. Exposed poles create air turbulence as the rotor rotates relative to the stator. By smoothing the surface between the stator pole faces by means of the shape of the bobbin, windage losses due to the turbulence are reduced.

Preferably, the winding includes means for mounting at least one magnet on one or both of the end loops.

In one particular embodiment the aperture provides clearance, when assembled within a switched reluctance machine stator, for a rotor to be inserted at least from one end.

The invention also extends to a method of assembling a stator for a reluctance machine, the stator defining stator poles and including a winding as defined above, the method including introducing the second end loop of the winding into a space in the stator between the stator poles, and tilting the winding such that the side portions are arranged substantially in parallel with the axis of the stator for excitation of at least some of the stator poles.

The coil may be arranged in the stator so that the coil sides partially or completely fill a space between adjacent stator poles.

Also according to an embodiment of the invention there is provided a switched reluctance machine including a winding as defined above. In this regard, the invention is particularly applicable to the machine of U.S. Pat. No. 5,043,618 (mentioned above) in which two poles of like polarity are grouped together.

The invention can be put into practice in various ways, some of which will now be described by way of example with reference to the accompanying drawings, in which:

BRIEF DESCRIPTION OF THE DRAWINGS

FIGS. 4(*a*) and (*b*) show prior art single phase stator and rotor stacks;

FIGS. 5(*a*) and (*b*) show coils assembled into the stator of FIG. 4;

FIGS. 6(*a*), (*b*) and (*c*) show a coil bobbin according to an embodiment of the invention;

DETAILED DESCRIPTION OF PREFERRED EMBODIMENTS

Figure 1:
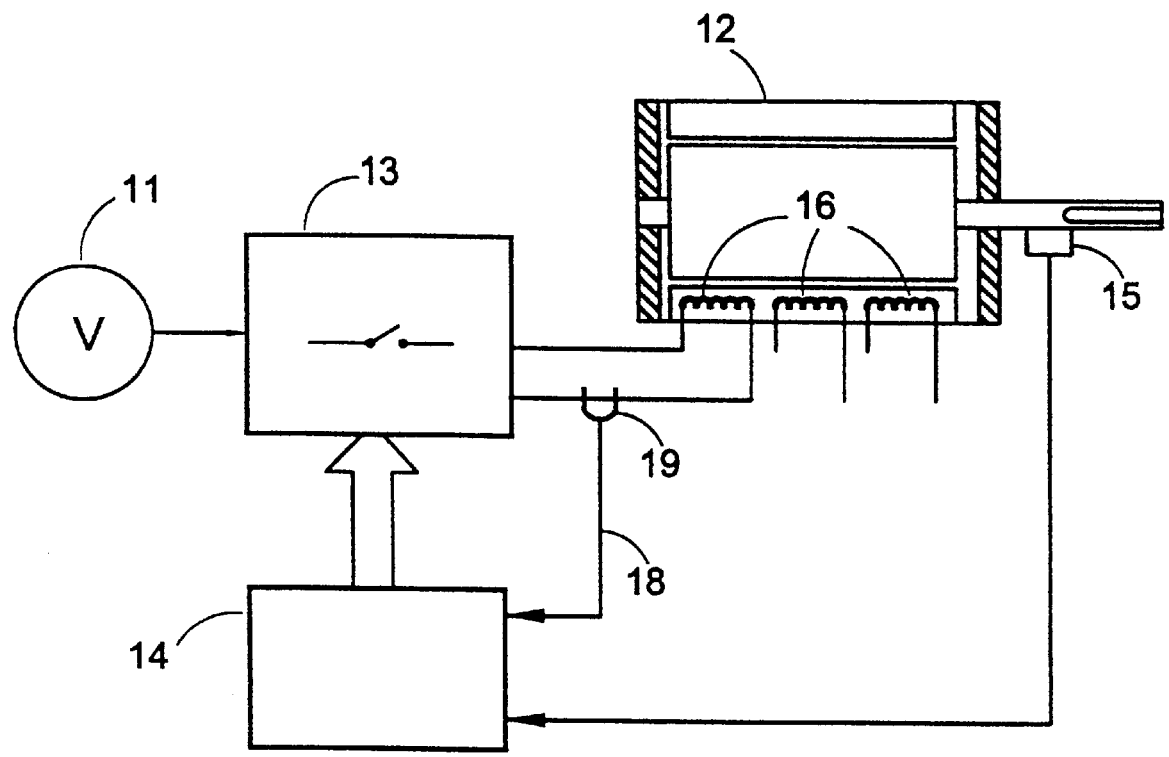
FIG. 1 shows the principal components of a switched reluctance drive system.
Figure 2:
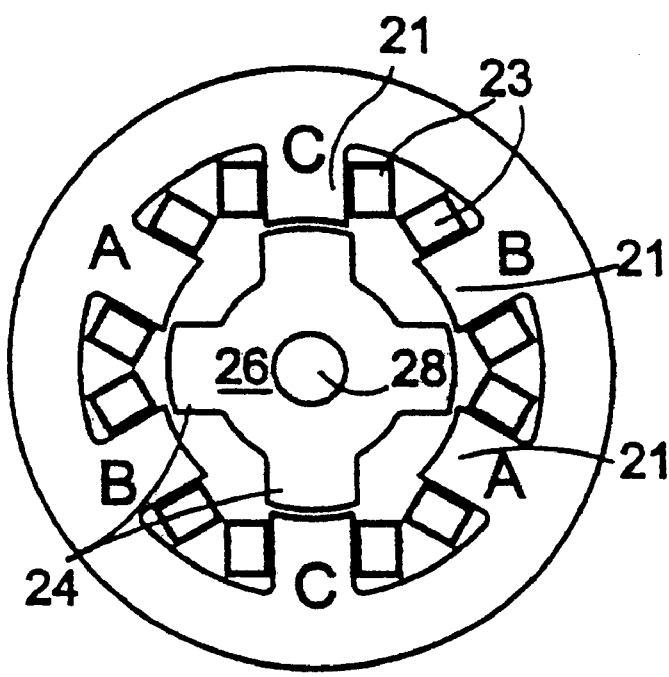
FIG. 2 shows a cross section of a typical switched reluctance machine.
Figure 3:
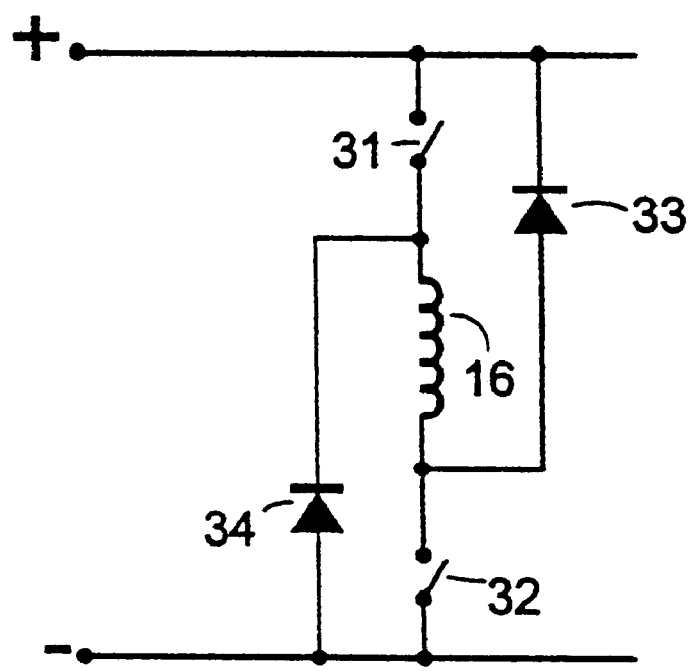
FIG. 3 shows typical switching circuitry in a power converter that controls the energization of the phase windings of the machine of FIGS. 1 and 2.

Referring to FIG. 6, a winding of electrically conductive material, such as copper wire, is shown mounted on a plastics bobbin 60. The bobbin 60 defines a generally circular aperture 62 (see FIG. 6(*a*)) which becomes the space in which a rotor turns in the assembled reluctance machine. In this embodiment, the winding 64 includes a number of turns of copper wire which lie in a channel defined by a pair of collars 66 and 68 which protrude from an inner base 70 which defines the aperture 62. The winding 64 comprises a pair of coil sides (one of which, 72, is shown in FIG. 6(*b*)) and end loops 74 and 76 which connect the ends of the coil sides together. The winding turns follow a path in the channel that is best seen in FIG. 6(*b*). The path of the end loop 74 is a generally coaxial arch around the circular aperture 62. The channel in this region extends at an angle of less than 90 degrees to the axis of the aperture. This allows for the insertion of the wound bobbin into the stator as will be made clear below. At the opposite end, the channel for the other end loop 76 is a generally coaxial arch which stands perpendicularly to the said axis in the assembled state of the winding in the stator.

Figure 7A:
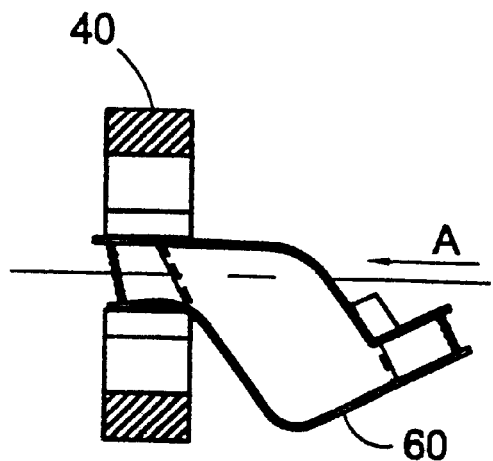
FIGS. 7(*a*), (*b*) and (*c*) show the stages of insertion of the bobbin of FIG. 6 into the stator of FIG. 4.
Figure 7B:
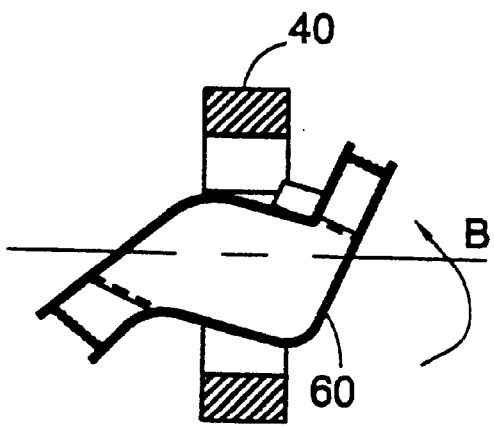
Figure 7C:
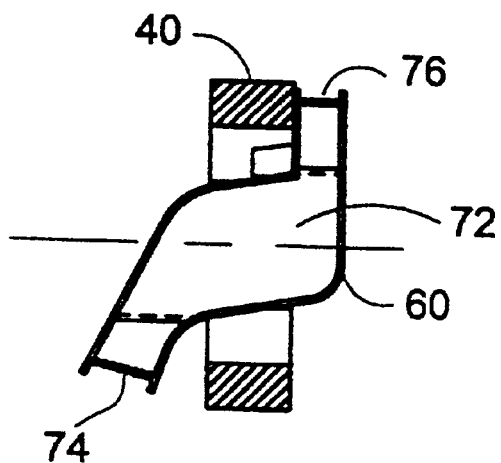

The bobbin is so shaped to allow for it to be inserted into a stator, clearing the stator poles but making use of the fact that there are wider slots defined in the spaces between the poles. The coil sides 72 have a trapezoidal shape which matches the available interpolar space in the stator. The part of the channel bearing the trailing end loop 76 of the coil carries a protuberance 78 which may be used to mount a parking magnet, as described in U.S. Pat. No. 5,548,173 (Stephenson), incorporated herein by reference. It will be appreciated that a magnet could be mounted on the other end loop or both end loops to the same effect. Overall, the dimensions of the bobbin are carefully chosen so that, when tilted on its major axis and the open face of the channel for the leading end loop 74 of the winding is arranged about the axis, the leading end loop 74 can be passed through the stator, with the coil sides 72 passing through the interpolar space. This is shown in FIG. 7(*a*), with arrow A denoting the initial direction of insertion along the axis of the circular space in the stator 40 where the rotor will rotate. As the coil enters the stator, it is rotated in the direction of arrow B and further inserted into the stator as shown in FIG. 7(*b*). Finally, the coil arrives in its final position in the stator, as shown in FIG. 7(*c*). The bobbin 60 can have retaining clips (not shown) molded into its surface to lock it in its final position relative to the stator. FIGS. 7(*a*), (*b*) & (*c*) are schematic in that they depict a complete bobbin being inserted into a section of a stator.

In the assembled position of the bobbin, the end loop 74 is spaced slightly outwardly from the stator due to the non-perpendicular angle it defines with the axis of the aperture. The end loop 76 is close up against the end surface of the stator to minimize the axial space it takes up. The aperture 62 (best seen in FIG. 6(*a*)) allows for a rotor to be inserted into the stator/winding assembly without disturbing the winding. However, before the winding is inserted into the stator it is possible for it to be tested so that failures can be rejected before the stator assembly process is begun.

It will be appreciated that the dimensions of those parts of the bobbin which pass through the stator are chosen to just clear the poles as the bobbin is inserted. The trapezoidal cross-section of bobbin, at least in respect of the leading end, allows the leading end loop of the winding to be inserted at a less tilted angle than if it had been more generally rectangular. This avoids the main body of the bobbin snagging on the stator poles which would prevent the winding being inserted at all. It will be seen that, though this embodiment is described in relation to a coil wound onto a bobbin, it applies equally to a coil wound onto a former and then removed from the former to provide a free standing coil. In both cases, the shape of the coil is not altered during or after insertion into the stator.

In the embodiment shown, the portions of the bobbin 60 carrying the coil sides 72 virtually fill the interpolar space they occupy. This is preferable, since it reduces windage loss at high speeds due to turbulence of the air created by the rotating rotor. It will be appreciated that the trailing end loop 76 of the bobbin could also carry a skirt instead of, or in addition to, the magnet-holding protuberance 78 which, when the bobbin is in place, would close off the mouth of the top interpolar space on the stator and give a further reduction in windage loss. Similarly, the leading end loop 74 of the bobbin could carry a skirt and/or a magnet which would close off the lower interpolar gap. In this way, the aperture of the complete stator assembly is made substantially smooth. Either or both of the end loops can have a mounting point for a bearing for supporting the rotor.

The detailed description has been based on an embodiment where the stator stack is formed in the traditional way from identical laminations of electrical sheet steel. Embodiments are also possible where the stator is profiled axially by the use of non-identical laminations (e.g. by the use of so-called "smart dies" to form the laminations) or by use of sintered material pressed to shape in a mold. In this way, the profile of the stator can be tailored along its axis to match the shape of the bobbin in its final position. This leads to an improved streamlining of the stator aperture and/or improved filling of the interpolar gap.

Having described the insertion of the bobbin into the stator, it should be emphasized that in practice the bobbin may be part of a larger assembly, such as an electronic controller which includes the power switches, components for a rotor position transducer and at least part of the control system for the complete drive. These parts have been omitted for clarity of description of the insertion of the bobbin into the stator.

Figures 8A, 8B:
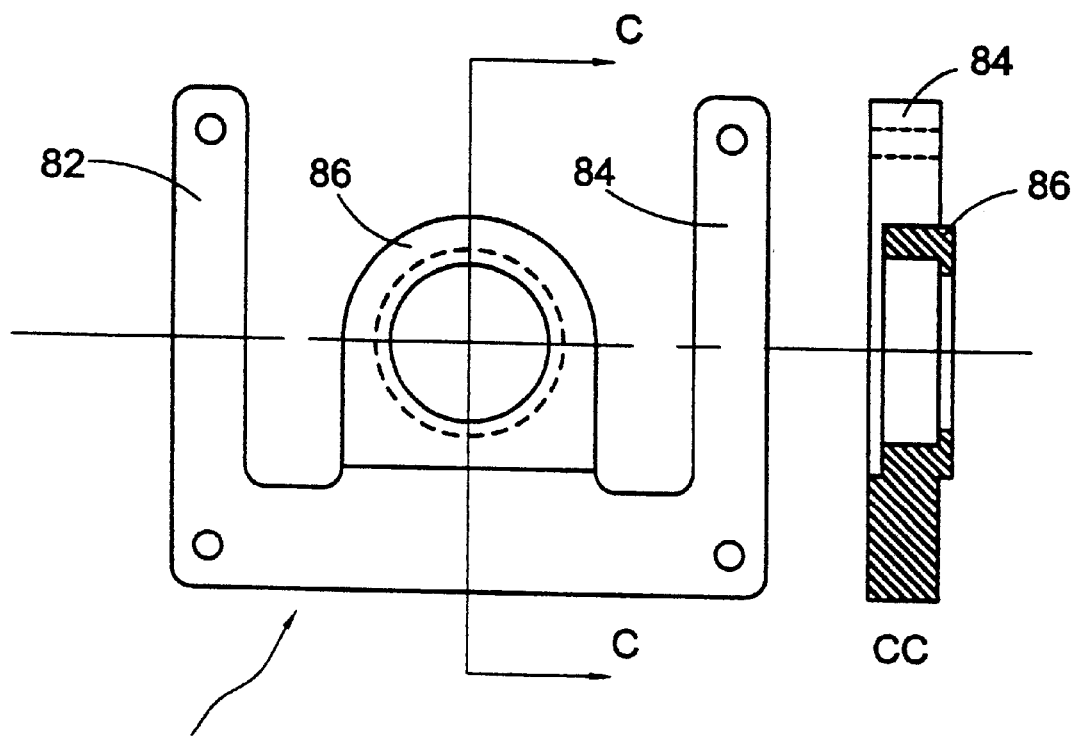
FIGS. 8(*a*), (*b*) shows an end frame suitable for use with an embodiment of the invention.

FIGS. 8(*a*) and (*b*) show a face view and a cross section, respectively, of an end frame 80 suitable for a motor incorporating the invention. The end frame 80 comprises a U-shape of outer limbs 82 and 84 and a bearing boss 86 defined between the limbs. Since the coil embraces the rotor, as well as the poles of the stator, it will tend to circulate homopolar flux in the machine. In order to avoid this flux causing losses or bearing problems, the end frames should be made from a non-ferromagnetic material, e.g. aluminum or any of a range of plastic compounds could be used. As noted above, the bearings may be mounted directly on the bobbin. This removes the requirement for end frames fixed to the stator or the housing in which the stator is mounted which would normally support a bearing assembly for the rotor at each end.

Figure 9:
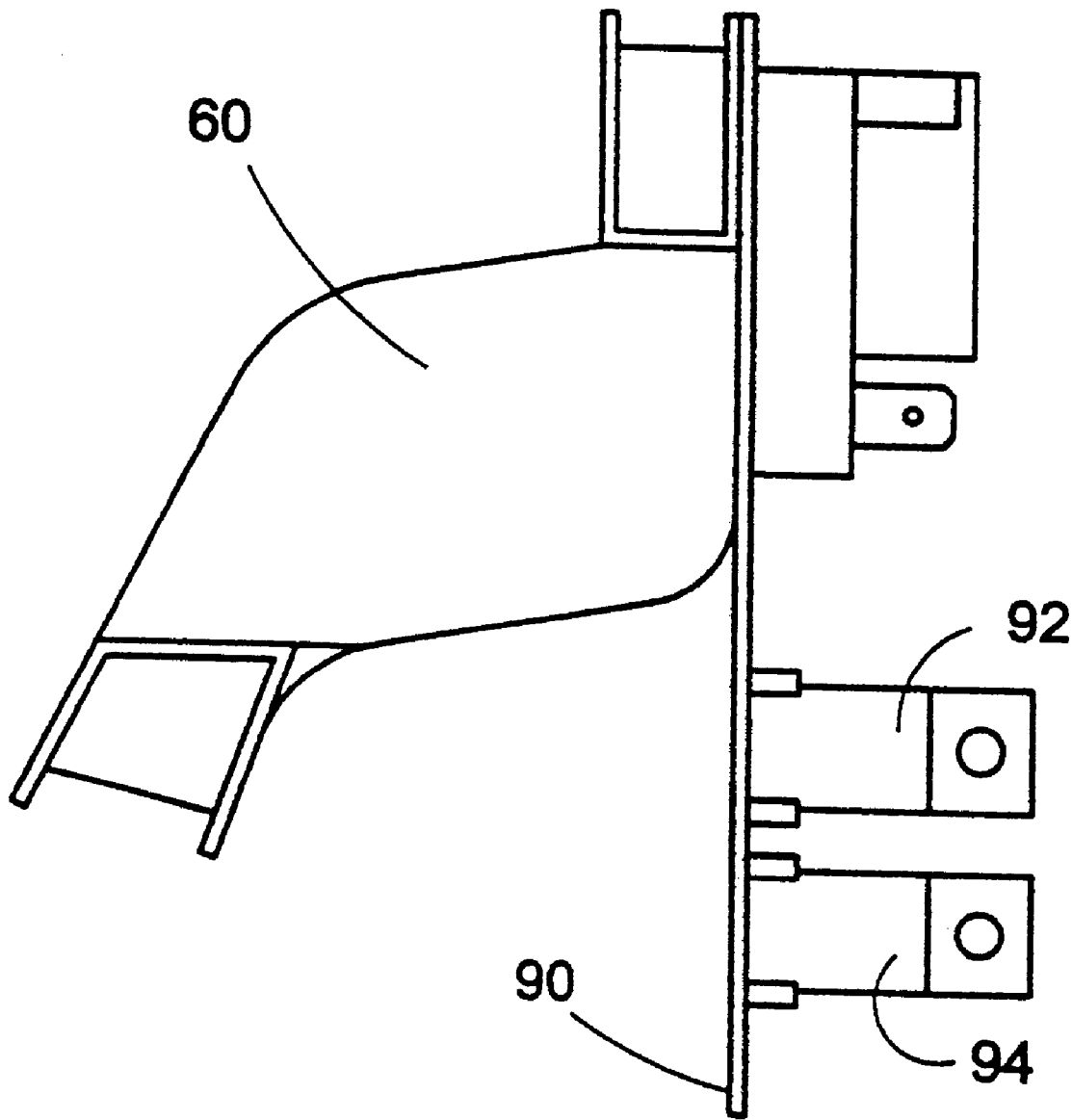
FIG. 9 shows a power converter assembled to the bobbin of FIG. 6.
Figure 10:
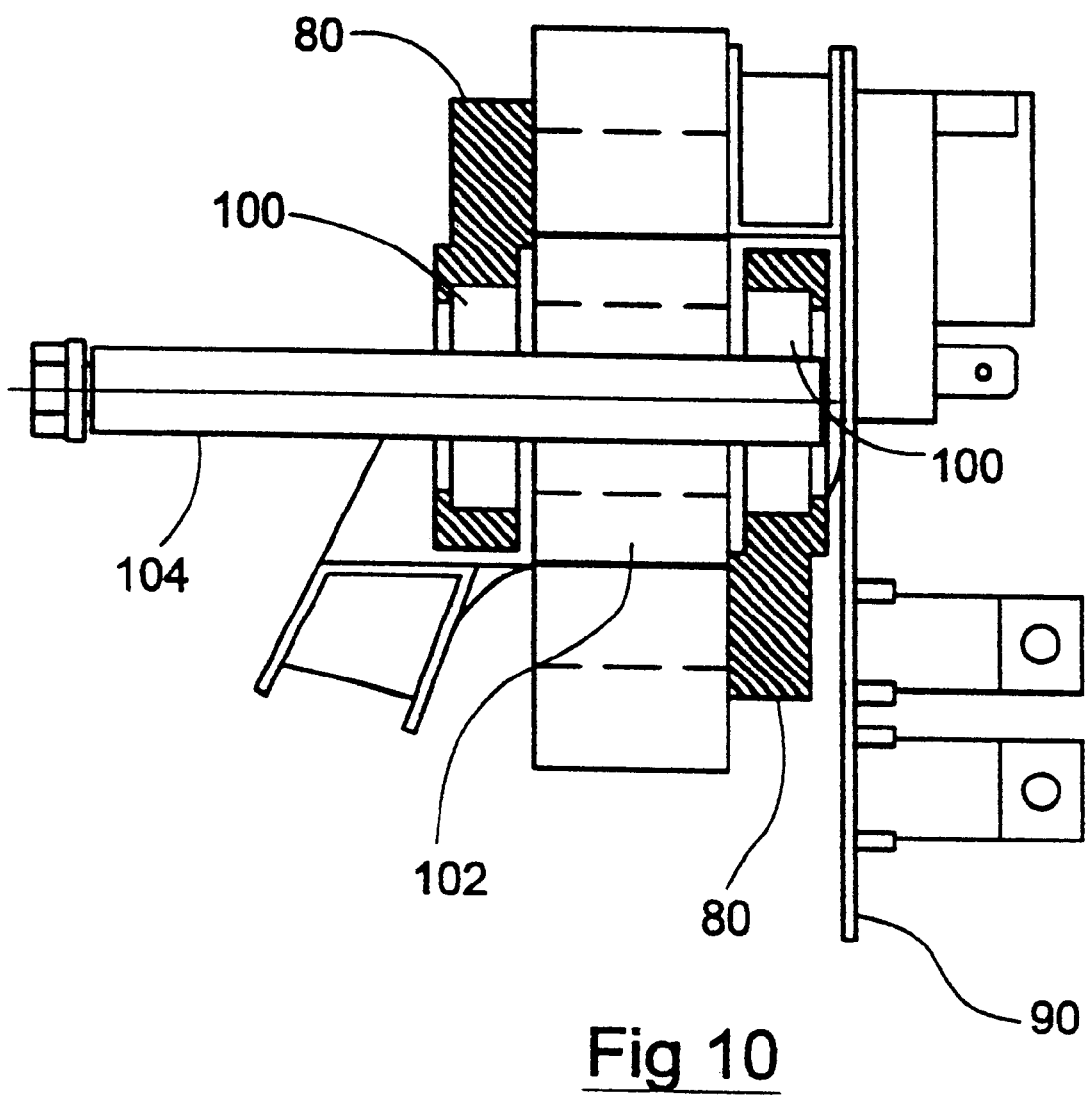
FIG. 10 shows a cross section of an assembled drive system according to an embodiment of the invention.

FIG. 9 shows a circuit board 90, mounted to the bobbin 60 of FIG. 6, carrying the components which comprise the electronic controller. The power switch(es) 92, 94 can be thermally connected to the end frame 80 (which may include heat sink means) to improve heat dissipation from the switch(es). FIG. 10 shows the reluctance machine mounted with end frames supporting bearings 100 on either end. A rotor 102 is mounted on a rotor shaft 104 which is rotatably mounted in the bearings 100. The rotor/stator assembly mounted with the bearings and the integrated electronic controller 90 provides a complete switched reluctance drive.

One sequence of manufacture of such a drive system is as follows.

1. The bobbin is loaded on a winding machine and the appropriate number of turns are wound onto the bobbin. Alternatively, the winding may be made on a former and removed from it to produce a rigid coil.
2. If required, the winding may be impregnated to consolidate it and improve its thermal performance. This may be carried out by conventional methods, e.g., dip and bake, trickle impregnation, curing of self-bonding wire, etc, all as well established in the art.
3. The circuit board carrying the electronic components of the drive system is mounted to the coil and the ends of the winding are terminated on the circuit board. Insulation displacement connectors, as known in the art, are particularly suitable for this purpose.
4. The complete assembly of winding, bobbin (if present) and circuit board may then be tested. It may be found useful to temporarily increase the inductance of the winding to simulate the magnetic circuit of the electrical machine by putting a ferromagnetic core in the winding. It may also be preferable to simulate the presence of rotor position transducer components which would normally be mounted on the rotor.
5. The tested assembly is then offered up to the stator and the coil is inserted using the methods described earlier.
6. The rotor assembly and the end frames are assembled to complete the drive system.

In this way, the novel coil shape allows a new, cost-effective, sequence of assembly and test to be used.

Figure 11:
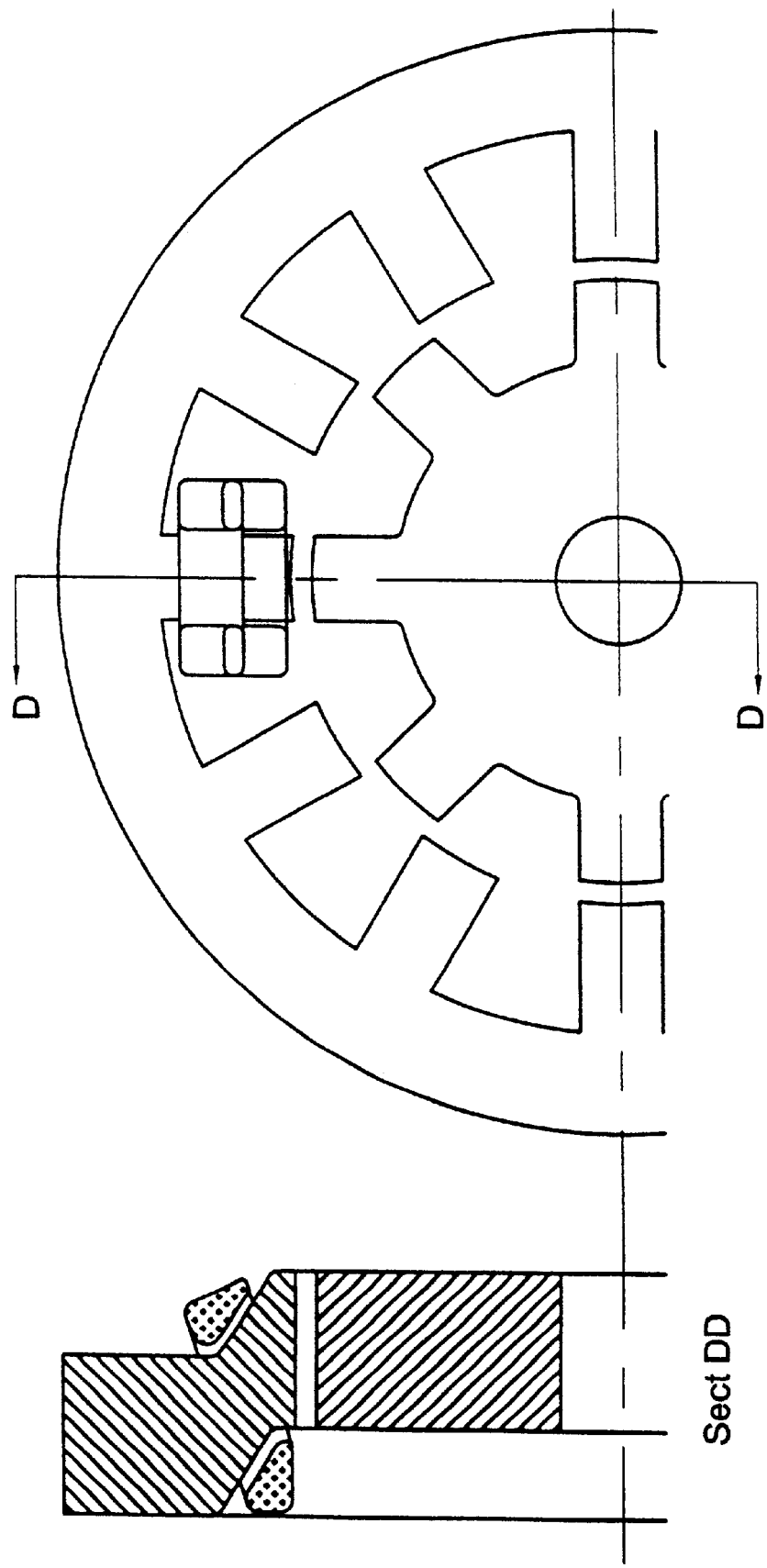
FIG. 11 shows an alternative embodiment of shaped coils with a specially shaped stator.

A further embodiment of a switched reluctance machine using coils having novel shapes is shown in FIG. 11. For simplicity, only one coil is shown. It is to be understood that other poles may carry coils of the same shape. The stator has poles cranked in the direction of the principle axis of the machine. This can be achieved either by making the stator from laminations which have been pressed to shape, coiled from narrow strip on edge or by molding the stator from a ferromagnetic compound or some combination of these. Instead of the coil lying in a plane generally parallel to the axis of the stator, as would be conventional, it also is cranked to fit in the available space so that the total axial length of the stator is reduced. This is of significant value in those situations where axial length is at a premium, particularly on machines with many poles, e.g. direct acting starter/generators for internal combustion engines.

From the discussions above, it will be apparent that the coil shape disclosed can be applied with particular benefit to any switched reluctance machine with a 2-pole field pattern. It will also be apparent that the invention can apply equally to machines operating in motoring or generating mode. Further, it will be recognized that the invention can be used with linear or inverted machines. Accordingly, while the invention has been described in connection with the illustrated embodiments discussed above, those skilled in the art will recognize that many variations may be made without departing from the present invention. Accordingly, the above description of embodiments is made by way of example and not for the purposes of limitation.

What is claimed is:

1. A winding for a reluctance machine, the winding comprising a single coil having opposed side portions, each side portion having first and second ends, a first end loop connecting the first ends of the side portions and a second end loop connecting the second ends of the side portions, at least one of the first and second end loops defining an arch between the side portions such that an enclosed aperture is defined by the winding when viewed generally along the direction of the side portions.

2. A winding as claimed in claim 1 in which the other of the first and second end loops also defines an arch between the side portions, the arches formed by the first and second end loops projecting in opposite directions.

3. A winding as claimed in claim 1 in combination with a bobbin on which the winding is mounted.

4. A winding as claimed in claim 3 in which an electrical circuit is mounted on the bobbin adjacent the first end loop.

5. A winding as claimed in claim 3 in which a rotor position transducer is mounted on the bobbin.

6. A winding as claimed in claim 4, wherein the electrical circuit is an electronic controller for controlling excitation of the winding.

7. A winding as claimed in claim 1 including at least one magnet mounted on at least one of the end loops.

8. A winding as claimed in claim 1 in which the aperture is substantially circular.

9. A winding as claimed in claim 1 in which the first end loop projects generally perpendicularly with respect to the direction of the side portions.

10. A winding as claimed in claim 1 in which the second end loop projects at an angle to the direction of the side portions.

11. A winding as claimed in claim 10, in which the angle is a second end loop angle, further in which the first end loop projects at a first end loop angle to the direction of the side portions, the second end loop angle being different than the first end loop angle.

12. A method of assembling a stator for a reluctance machine, the stator including a stator body defining stator poles and including a winding as claimed in claim 1, the method including:

introducing the second end loop of the winding into a space in the stator body between the stator poles;

tilting the winding such that the side portions are arranged substantially in parallel with the axis of the stator body, and arranging the side portions for excitation of at least some of the stator poles.

13. A method as claimed in claim 12 in which each side portion substantially fills an interpolar space between poles.

14. A stator for a reluctance machine, the stator being assembled by the method of claim 12.

15. A reluctance machine comprising a stator defining stator poles, a rotor defining rotor poles and a winding as claimed in claim 1.

16. A machine as claimed in claim 15 in which each side portion substantially fills an interpolar space between stator poles.

17. A machine as claimed in claim 15 in which the arch or arches in the end loop(s) of the winding provide clearance for insertion of the rotor along its axis of rotation.

18. A machine as claimed in claim 15, including means, secured to the stator, for holding the winding in place.

19. A machine as claimed in claim 18 in which the means for holding includes bearing means and the rotor includes a rotor shaft mounted in the bearing means.

20. A machine as claimed in claim 15, wherein the winding is mounted on a bobbin, further wherein the bobbin has at least one skirt arranged to substantially close off at least one of the interpolar gaps in the stator.

21. A machine as claimed in claim 20 in which the bobbin carries a bearing component for supporting the rotor, the rotor having a component complementary to the bearing.

22. A stator for a reluctance machine, the stator comprising a winding as claimed in claim 1.

23. A winding as claimed in claim 1, in which the enclosed aperture defined by the winding when viewed generally along the direction of the side portions defines a central longitudinal axis, the central longitudinal axis extending generally in the direction of the side portions.

24. A winding as claimed in claim 23, in which the first end loop extends on one side of the central longitudinal axis and the second end loop extends on a side of the central longitudinal axis opposite the one side.

25. A winding as claimed in claim 1, in which the first and second end loops extend in opposite directions relative to the aperture.

26. A winding as claimed in claim 1, in which the first and second end loops extend in opposite directions relative to the side portions.

* * * * *